(12) United States Patent
Magerl et al.

(10) Patent No.: US 9,254,534 B2
(45) Date of Patent: Feb. 9, 2016

(54) ENERGY CONVERSION METHOD AND APPARATUS, AND WELDING DEVICE

(75) Inventors: Christian Magerl, Langschlag (AT); Jürgen Binder, Scharnstein (AT); Walter Stieglbauer, Manning (AT); Bernhard Artelsmair, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 1004 days.

(21) Appl. No.: 13/395,230

(22) PCT Filed: Sep. 10, 2010

(86) PCT No.: PCT/AT2010/000327
§ 371 (c)(1),
(2), (4) Date: Mar. 9, 2012

(87) PCT Pub. No.: WO2011/029117
PCT Pub. Date: Mar. 17, 2011

(65) Prior Publication Data
US 2012/0175357 A1    Jul. 12, 2012

(30) Foreign Application Priority Data
Sep. 10, 2009   (AT) .................................. A 1427/2009

(51) Int. Cl.
| | | |
|---|---|---|
| B23K 9/00 | (2006.01) | |
| B23K 33/00 | (2006.01) | |
| B23K 35/30 | (2006.01) | |
| B23K 9/10 | (2006.01) | |

(52) U.S. Cl.
CPC ..................... B23K 9/1043 (2013.01)

(58) Field of Classification Search
CPC ............ B23K 9/06; B23K 9/09; B23K 9/091; B23K 9/095; B23K 9/10; B23K 9/1012; B23K 9/1043; B23K 9/1081; H02J 7/345
See application file for complete search history.

(56) References Cited

U.S. PATENT DOCUMENTS

| | | |
|---|---|---|
| 2005/0109748 A1 | 5/2005 | Albrecht et al. |
| 2007/0181547 A1 | 8/2007 | Vogel et al. |

FOREIGN PATENT DOCUMENTS

| | | |
|---|---|---|
| DE | 26 50 522 | 5/1978 |
| EP | 0 949 751 | 10/1999 |
| EP | 1 364 737 | 11/2003 |
| GB | 2 316 244 | 2/1998 |

OTHER PUBLICATIONS

International Search Report of PCT/AT2010/000327, date of mailing Jan. 21, 2011.
Austrian Office Action in A1427/2009 dated Jul. 30, 2010 with English translation of relevant parts.

*Primary Examiner* — Dana Ross
*Assistant Examiner* — Brandon Harvey
(74) *Attorney, Agent, or Firm* — Collard & Roe, P.C.

(57) ABSTRACT

The invention relates to a method and an apparatus for converting the energy of an energy storage (2) for operating an arc (6), wherein in order to convert energy, at least one switch (9) of a step-down converter is switched on and off in a controlled manner, wherein said at least one switch (9) is connected to the energy storage (2) at the input end. In order to be able to supply as much of the limited energy available from the energy store (2) to the arc (6), it is provided that a synchronous converter is used as the step-down converter for operating the arc (6), and that the at least one switch (9) of the synchronous converter that is designed as a power unit (3) is connected to a snubber circuit (10) at the output end such that at least the switch (9) is switched on and off in an snubbed state.

9 Claims, 3 Drawing Sheets

ENERGY CONVERSION METHOD AND APPARATUS, AND WELDING DEVICE

CROSS REFERENCE TO RELATED APPLICATIONS

This application is the National Stage of PCT/AT2010/000327 filed on Sep. 10, 2010, which claims priority under 35 U.S.C. §119 of Austrian Application No. A 1427/2009 filed on Sep. 10, 2009, the disclosure of which is incorporated by references. The international application under PCT article 21(2) was not published in English.

The invention relates to a method for converting the energy of an energy store for operating a load, in particular an arc, wherein in order to convert energy, at least one switch of a step-down converter is switched on and off in a controlled manner, wherein said at least one switch is connected to the energy storage at the input end.

The invention further relates to an apparatus for converting the energy of an energy storage for operating the arc, comprising a step-down converter with at least one switch which can be switched on and off in a controlled manner, said at least one switch being connected to the energy storage at the input end.

Finally, the invention relates also to a welding device comprising an energy storage, a torch for the generation of an arc, and an apparatus for converting the energy of the energy storage for operating the arc with a step-down converter having at least one switch which can be switched on and off in a controlled manner.

In order to enhance mobility, it is generally understood to use energy storages as power supply for supplying the electronics or power electronics of a corresponding device with electronic energy such that the application can be carried out with the device. Because of the limited energy of the energy storage, said energy storage has to be recharged regularly.

The use of energy storages in devices for metalworking, as for instance in welding devices, is for example known from the documents DE 26 50 522 A1 and GB 2 316 244 A.

US 2005/0109748 A1 describes a welding apparatus with an energy storage for the generation of the welding energy or of the arc. The voltage of the energy storage is transformed by means of a step-up converter or boost converter up to an intermediate voltage which, in turn, is stepped down to the voltage required for the arc by a downstream step-down converter or buck converter. The energy storage can be recharged by means of a charging device. The charging device forms an independent unit which can either be integrated in the welding device or can be connected to the energy storage as an external unit. In this connection it is disadvantageous that the energy for the arc is generated in two steps, whereby switching losses occur in the step-up converter as well as also in the step-down converter, and that thereby the efficiency is decreased. In addition, the step-down converter has to convert the stepped-up intermediate voltage to the height of the desired arc voltage so that due to the larger voltage difference the switching losses are increased.

EP 0 949 751 A2 describes a converter for welding devices, in which the switches of a step-down converter are switched on and off correspondingly. The use of a battery-driven welding device is not disclosed.

US 2007/181547 A1 describes a battery-driven welding device with a circuit for the charging of the energy storage.

The object of the present invention consists in the creation of an above-mentioned method and of an above-mentioned apparatus by which the limited energy available from the energy storage can be supplied to the arc with a minimum of switching losses. Disadvantages of known methods or apparatuses shall be avoided or at least reduced.

A further object of the invention consists in the creation of an above-mentioned welding device and of a method which can be carried out therewith, by which the user can be provided with an optimum energy management for the utilization of the limited energy of the energy storage.

The object of the invention is solved by an above-mentioned method for converting energy, in which a synchronous converter is used as the step-down converter for operating the arc, and in which the at least one switch of the synchronous converter that is designed as a power unit is connected to an snubber circuit at the output end such that at least the switch is switched on and off in a snubbed state, in that at the switch-on process of the at least one switch the current rise is limited by an inductor arranged in series with the switch, after the switch-on process a control unit is activated and at least one capacitor allocated to the switch at the output end is charged while the switch is in the switched-on state, and at the switch-off process of the at least one switch and with the control unit being deactivated, the voltage applied at the switch at the output end is held substantially at the voltage of the energy storage by means of the capacitor. Owing to the implementation of the snubber circuit with storage components, a highly efficient utilization of the energy of the energy storage is achieved, as by means of the storage components the energy is stored temporarily during the switching-over and is then subsequently supplied to the arc. Consequently, substantially no energy gets lost. By the direct connection of the synchronous converter to the energy storage, the losses can be reduced even further so that this results in a very high degree of efficiency. Due to the occurrence of only minimum switching losses in the at least one switch of the synchronous converter, degrees of efficiency in the range of 99% can be obtained. The reduced losses also result in a very low development of heat so that a very small ventilator or fan is sufficient or that in particular in case of smaller powers the required cooling is already achieved by convection. Accordingly, for the power unit only a very small space is required which, in comparison with the space requirement of the energy storage, is not relevant in most cases.

The object according to the invention is also solved by an above-mentioned method for converting the energy of an energy storage for operating a load, wherein the step-down converter that is designed as a power unit is used for providing the supply to the load, i.e. for feeding the load, and for charging the energy storage.

Preferably, the control unit is formed by a switch that is connected at least with a capacitor and a diode at the output end so that the switch is deactivated in a snubbed state.

While the switch is in the switched-on state and the control unit is deactivated, preferably at least one storage component of the snubber circuit will be charged completely by at least one further storage component of the snubber circuit for a switch-on process of the switch in a snubbed state.

As a result of the measures at the moment of the switch-on process and during the switch-on process, it is advantageously achieved that only a very small current will flow through the switch and, thus, only minimum switching losses will result. And at the switch-on process, the switch is substantially not influenced by the snubber circuit, as said snubber circuit or the control unit will only be activated after the switch-on process. In the course of this, the storage components will be charged in a controlled manner so that an optimum snubbing of the switching is possible. Furthermore, during the charging of the storage components, the temporarily stored energy is efficiently used, as therewith in part other storage components are charged.

At the switch-off process of the switch of the synchronous converter, preferably at least a part of the storage components of the snubber circuit becomes independently active with the switch-off process of the switch.

According to a further feature of the invention, with the switch-off process at least one storage component of the snubber circuit is discharged to the output of the synchronous converter for the switch-on process of a switch. By the measures that at the moment of the switch-off process and during the switch-off process the snubber circuit becomes active substantially without any time delay, the switching losses can be held at a minimum level. And also the voltage drop at the switch can be kept very low so that only minimum switching losses result therefrom. It is also advantageous that the snubbing of the switching-on for the next switch-on process is guaranteed. In this connection, additionally the temporarily stored energy is made available to the arc at the output.

It is furthermore advantageous when the synchronous converter is also used for charging the energy storage as a step-up converter by exchanging the input and the output of the synchronous converter. Through this, no additional components are required for the charging of the energy storage.

The object of the invention is also solved by an above-mentioned apparatus for converting the energy of an energy storage, wherein the step-down converter is formed by a synchronous converter, and the at least one switch of the synchronous converter that is designed as a power unit is connected at the output end to an snubber circuit having storage components for the switching on and off of the at least one switch in a snubbed state, wherein, for the snubbing of the switch-on process of the at least one switch, an inductor connected in series with the switch is provided, and, for the snubbing of the switch-off process of the at least one switch, a diode connected with the at least one switch and a capacitor which is connected to a control unit are provided. The advantages resulting therefrom can be inferred from the advantages already described above and from the following description.

Advantageously, a means for charging the energy storage is provided and said means is formed by the synchronous converter with the input and the output being exchanged so that the synchronous converter can be used as a step-up converter for charging the energy storage.

For displaying the charging state of the energy storage, preferably a light emitting diode can be provided at an input and/or output device.

Furthermore, a setting element for the switching on and off of the charging device can be provided once again preferably at an input and/or output device.

Finally, the object according to the invention is also solved by an above-mentioned welding device, wherein the apparatus for converting energy is designed for carrying out the above described method.

The present invention will now be explained in detail by means of the accompanying schematic drawings, wherein.

As an introduction it is stated that identical elements of the embodiment will be provided with identical reference numerals.

Figure 1:
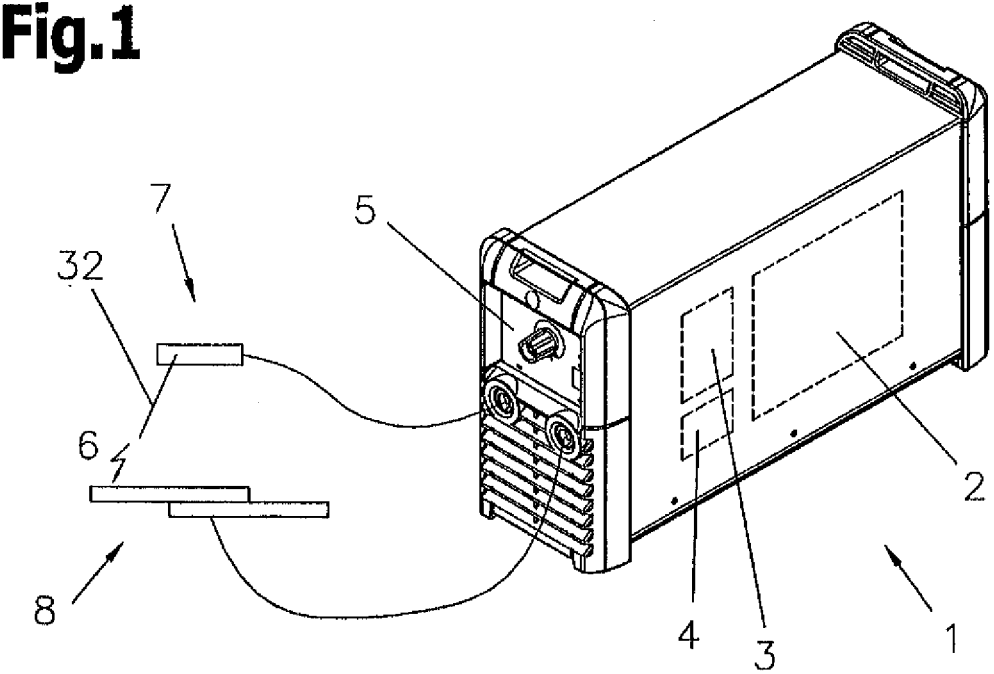
FIG. 1 is a schematic representation of a welding device.

In FIG. 1 there is shown a device 1 which comprises at least an energy storage 2, a power unit 3, a control device 4 and an input and/or output device 5. The device 1 is designed for the formation of an arc 6 which can be controlled by the control device 4. Thus, the device 1 can for instance be used as a welding device, a cutting device, a cleaning device or as a soldering device. Details of such devices 1, as for instance the cooling of a torch 7, will not be described in detail as these are generally known from the state of the art.

The current for the arc 6 is generated between an electrode 32 which is arranged in or held by means of an electrode holder in the torch 7, and a workpiece 8. For this, the workpiece 8 which is formed of several parts is also connected to the device 1. Correspondingly, the current is provided from the power unit 3 which is fed by the energy storage 2. Furthermore, the current and, if necessary, further parameters can be set or adjusted, or controlled or regulated at the input and/or output device 5. For this purpose, the input and/or output device 5 is connected to the control device 4. Preferably, the power unit 3 is provided at the output thereof with connections or sockets via which the torch 7 or the workpiece 8 can be coupled thereto. Correspondingly, the power unit 3 converts the energy stored in the energy storage 2 such that for instance a welding process can be carried out, as will be described in the following embodiment.

According to the invention, the limited energy available from the energy storage 2 can be supplied to the arc 6 with a minimum of switching losses by using a step-down converter as the power unit 3 for operating the arc 6 and by carrying out the switching-over processes of at least one switch 9 of the step-down converter in a snubbed state, wherein the at least one switch 9 is connected to the energy storage 2. For this purpose, a snubber circuit 10 for carrying out snubbed switching-over processes will be integrated into the step-down converter.

Figure 2:
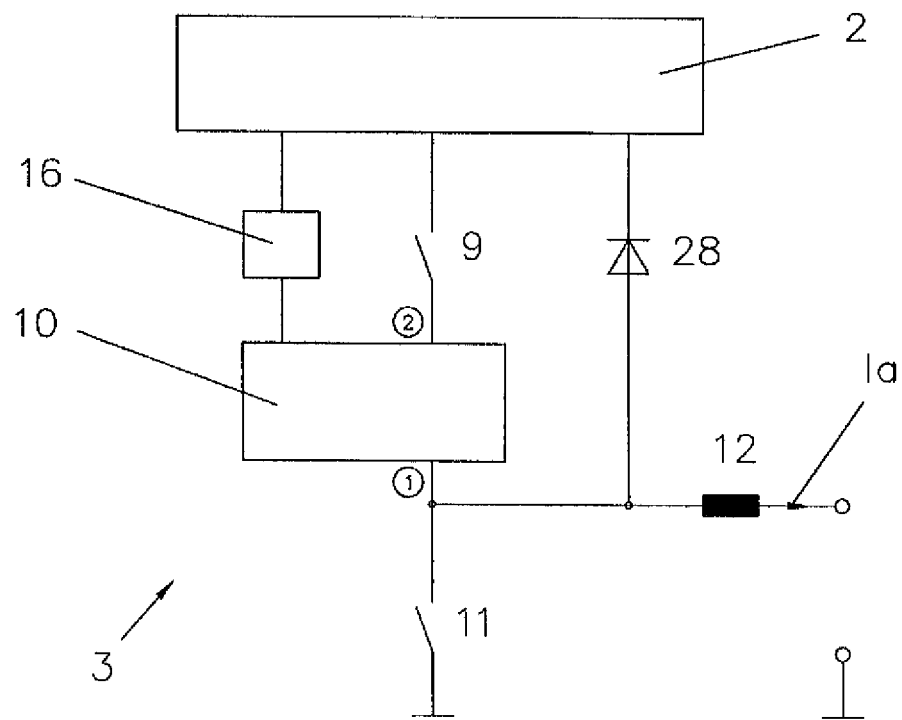
FIG. 2 is a schematic block diagram for carrying out the snubbed switching-over processes according to the present invention.
Figure 3:
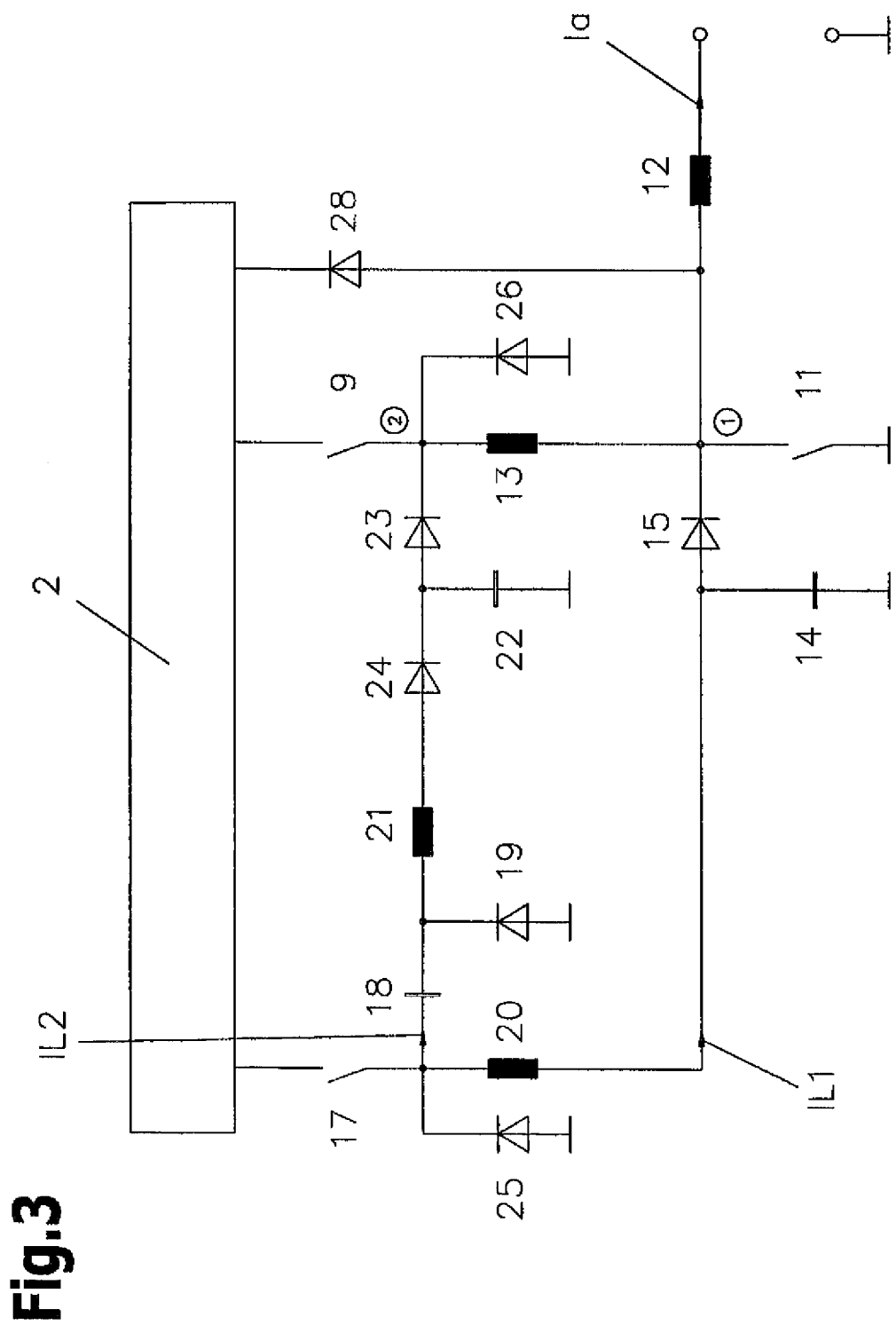
FIG. 3 is a circuit diagram of a power unit of a welding device that is designed in accordance with the present invention.

The power unit 3 according to the invention with the integrated snubber circuit 10 will now be described in the following on the basis of FIG. 2 and FIG. 3. The basic components of the step-down converter are the switches 9 and 11 and the inductor 12. In this connection it is spoken of a synchronous converter which is used as a synchronous step-down converter. In order to be able to efficiently generate the energy for the arc 6, i.e. with a degree of efficiency in the range of 99%, according to the invention the switch 9 is wired with the snubber circuit 10 such that a snubbing of the switching-on during the switch-on processes as well as also a snubbing of the switching-off during the switch-off processes are obtained as a result thereof. As a consequence thereof, extremely little energy is converted into heat, and, therefore, only a minimum cooling of the electronics of the power unit 3 is required. Consequently, also the space requirement of the power unit 3 is reduced to a minimum.

In the present embodiment, the snubber circuit 10 is implemented with storage components like capacitors and inductors as well as diodes. In general, the diodes control the direction of current, whereby the energy of the energy storage 2 can be converted into the energy required for the arc 6 of a welding process, cutting process or cleaning process with minimal switching losses during the switching-over processes of at least the switch 9.

In this connection, the snubbing of the switching-on is divided into two circuits, wherein a first circuit is formed by the inductor 13 in series to the switch 9 and a second circuit exists through the capacitor 14 and the diode 15. The second circuit is controlled or regulated actively by a control unit 16. The first circuit is indirectly controlled or regulated actively via the second circuit so that, in total, an active switching-on snubbing is achieved.

In its simplest form, the control unit 16 is formed by a switch 17 which, like the switch 9, is connected with the energy store 2 at the input end. In this case, also the switch 17 will be snubbed accordingly. In concrete terms, a snubbing of the switching-off takes place via the capacitor 18 and the diode 19 and a snubbing of the switching-on takes place via the inductor 20 and the inductor 21.

The snubbing of the switching-off for the switch 9 is effected in a similar way as for the switch 17, namely via the capacitor 22 and the diode 23. In this connection, the diode 23 prevents an uncontrolled charging of the capacitor 22 via the switch 9 during the time when the switch 9 is in the switched-on state.

A snubbing for the switch 11 is not required, as this results automatically from the basic functional principle of the synchronous step-down converter, as is generally known from the state of the art.

The function of the snubbing of the switching-on and of the switching-off during switching-over processes which are actively controlled by the control device 4 of the welding device 1 according to the control of the synchronous converter will be described in detail starting out from the following initial situation:

Switch 9 open; switch 11 closed; capacitors 14, 18 and 22 as well as the inductors 20, 21 and 13 uncharged.

In accordance with this initial situation, the output current Ia or the welding energy is supplied via the electric circuit formed by the switch 11 and the inductor 12, wherein the voltage at the switch 11 is substantially zero. Accordingly, the inductor 12 will be discharged. In order that the inductor 12 will be charged again in the next step, the switch 9 will be switched on and the switch 11 will be switched off in a snubbed state.

When the switch 9 is switched on, according to the invention the switching-on snubbing will be active so that at the moment of the switching-on, only the self-capacitance of the switch 9 has to be reloaded or transferred. Due to this, only minor, almost negligible switch-on losses result therefrom. This is achieved by the inductor 13 connected in series to the switch 9, said inductor 13 limiting the current rise at the moment of the switching-on such that the current rise will take place continuously in accordance with the dimensioning of the inductor 13. Thus, the minimum switching losses will only be caused by a fractional of amount of the output current Ia.

This increase in current continues until the current through the inductor 13 is as large as the output current Ia. That means that because of the current limitation, the output current Ia flows in a time-delayed manner completely through the switch 9 to the output. Thus, no more current will flow to the output via a diode 15 connected in parallel to the switch 11 so that a capacitance 14 is recharged in parallel to the switch 11. In the simplest case, said diode 15 and said capacitance 14 are part of a power transistor which forms the switch 11. In this connection, the recharging is effected via the inductor 13 connected in series to said capacitance 14. Thereby it is caused that the voltage at the node K1 will increase in a time-delayed manner and continuously or slowly up to the supply voltage—i.e. the voltage of the energy storage 2.

Furthermore, by said slow increase of voltage, voltage peaks are avoided at the switch 9 as well as also at the switch 11, so that an unintentional short-time switching-over of the switch 9 or 11 is prevented. In particular it is prevented that, when the switch 9 is in the switched-on state, also the switch 11 will be switched on. In this connection it is spoken of a so-called "conductive phase" in which the welding energy is supplied directly from the energy storage 2. This is the case when the supply voltage lies across the node K1.

During the "conductive phase", corresponding preparations have to be made for the following switching-off snubbing and also for the next switching-on snubbing. In a "charging phase" taking place during the "conductive phase, the capacitors 14, 18 and 22 will be charged, as the control unit 16 will be activated, i.e. the switch 17 will be switched on. The first possible point of time for the activation of the control unit 16 is that when the supply voltage is applied on the node K1. The switch 17 will remain in a switched-on state until half of the supply voltage is applied at capacitor 14. Furthermore, the capacitors 22 and 18, which are of a smaller dimension than the capacitor 14, will be fully charged via the inductor 21 and the diode 24 during that time. Said inductor 21 and diode 24 are arranged between the capacitor 18 and the capacitor 22 so that both capacitors 18, 22 will be charged with the same charging current IL2. In this connection, the inductor 21 controls the charging time of the capacitors 18 and 22—which are of the same size—such that these capacitors will be charged simultaneously and identically up to the supply voltage. In this connection, the capacitors 18 and 22 will be charged at the most during a time which is required for reaching half the supply voltage at the capacitor 14. In accordance therewith the dimensioning of the inductor 21 will be implemented. Furthermore, the choke 21 and the diode 24 will effect that during the charging of the capacitors 18 and 22 the said capacitors are connected in series. For the realization of the switching-off snubbing, however, the capacitor 18 and the diode 19 or the capacitor 22 and the diode 23 operate independently of each other.

During said time, there is also stored energy in the inductor 20—which is connected in series to the switch 17—according to the charging current IL1 of the capacitor 14.

The switch 17 will be switched off when the capacitors 18 and 22 have been completely charged and when half the supply voltage is applied at capacitor 14. Here, the charged capacitor 18 and the diode 19 serve as a switching-off snubbing for the switch 17, as, at the moment of switching, the supply voltage is also present at the output end of the switch 17 due to the capacitor 18, and because of this the switch 17 can be switched off or opened substantially voltage-free or without any difference in potential. The complete discharging of the capacitor 18 is effected subsequently via the inductor 20 to the capacitor 14 or to the output. Thus, owing to the inductor 21, the diode 19, and the diode 25, said temporarily stored energy will not be lost. The capacitor 18 will be discharged, while the capacitor 22 will be continuously kept at the supply voltage.

With the switching-off of the switch 17, the capacitor 14 will be charged up to the supply voltage with the energy stored in the inductor 20. This takes place via the electric circuit formed by the inductor 20, the capacitor 14 and the diode 25. The inductor 20 is dimensioned such that during the switching-on time of the switch 17 sufficient energy will be stored in order to be able to charge the capacitor 14 up to the supply voltage when the switch 17 is in the switched-off state.

Finally, when the supply voltage is reached at the capacitor 14, also the "charging phase" during the "conductive phase" is finished. Thus, also the "conductive phase" can be terminated, as the switching-off snubbing for the switch 9 is guaranteed. Additionally, also the removal of energy from the inductor 13 is guaranteed so that substantially also the switching-on snubbing for the next switch-on process of the switch 9 is available simultaneously with the switching-off of the switch 9.

When the switch 9 is switched off, the switching-off snubbing is effected in the same way as for the switch 17, in that through the charged capacitor 22 and via the diode 23 the supply voltage is also made available at the output end at the switch 9 or at the node K2 so that substantially no voltage drop or difference in potential results therefrom at the switch 9 and, consequently, said switch 9 can be switched off almost free of losses.

Hence, also no more current will flow from the energy storage 2 via the switch 9 into the inductor 13 so that also the energy stored therein can substantially be discharged completely. This is carried out such that by the complete discharging of the capacitor 22 the voltage at node K2 will decrease continuously via the diode 23 to the output. And with the switching-off of the switch 9, also the capacitor 14 which influences the voltage at the node K1 is discharged. In this connection, through the capacitor 14 which is larger than the capacitor 22, the voltage at the node K1 decreases at a slower rate than at the node K2. Thereby, a so-called negative voltage-time area is applied to the inductor 13 whereby the current through the inductor 13 decreases, as the polarity of the voltage at the inductor 13 is reversed due to the capacitor 22 which was discharged at an earlier point of time. Thus, the potential at the node K2 or at the output end of the switch 9 will be substantially zero after the discharging of the capacitor 22, wherein said potential at the node K2 is held by the diode 26. In this connection, the negative voltage-time area at the inductor 13 effects that the current resulting from the discharging of the inductor 13 is supplied to the output. Consequently, the energy of the inductor 13 and of the capacitor 14 will be supplied to the output current Ia substantially without any losses. Thus, snubbing of the switching-on is again available for the next switch-on process of the switch 9. Correspondingly, the switch 11 will be switched on again when the switch 9 will be switched off, so that the output current Ia will not be interrupted. In concrete terms, this takes place when at node K1 the voltage has substantially decreased to zero. Thus, switching-on snubbing is given. According thereto, the initial situation is once again established. Accordingly, this is repeated as long as welding energy is required.

Figure 4:
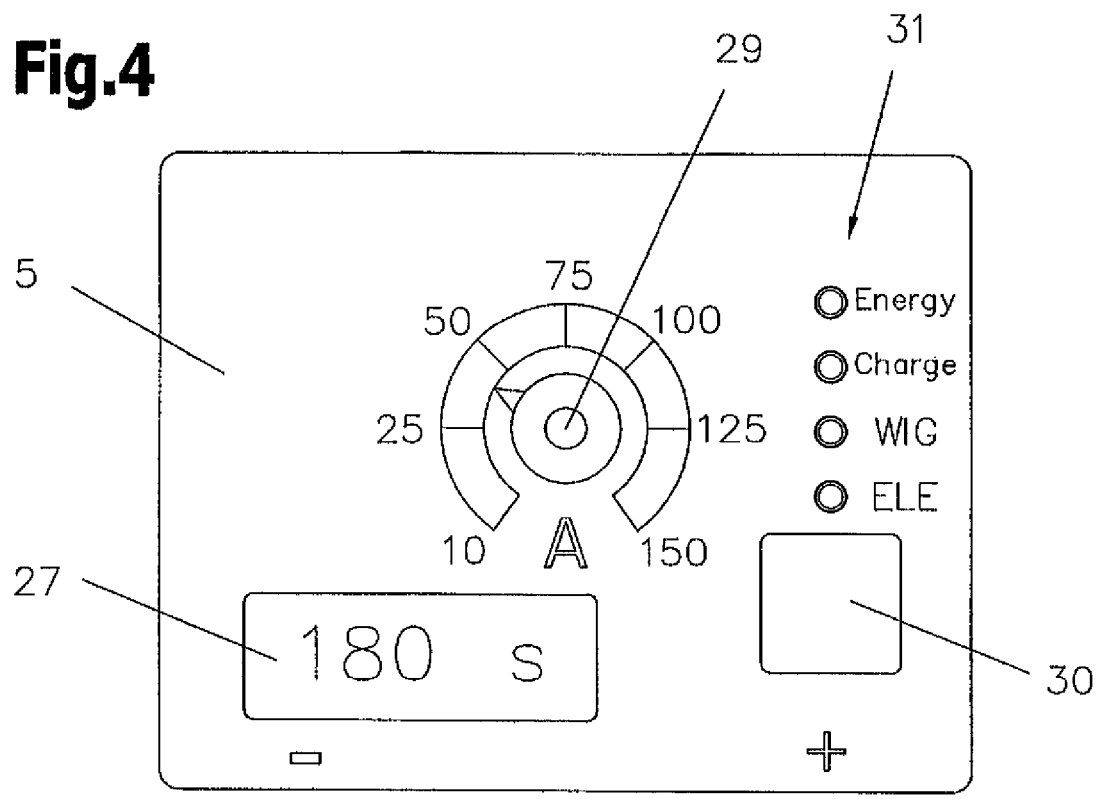
FIGS. 4 and 5 are schematic representations of an input and/or output device of a welding device.
Figure 5:
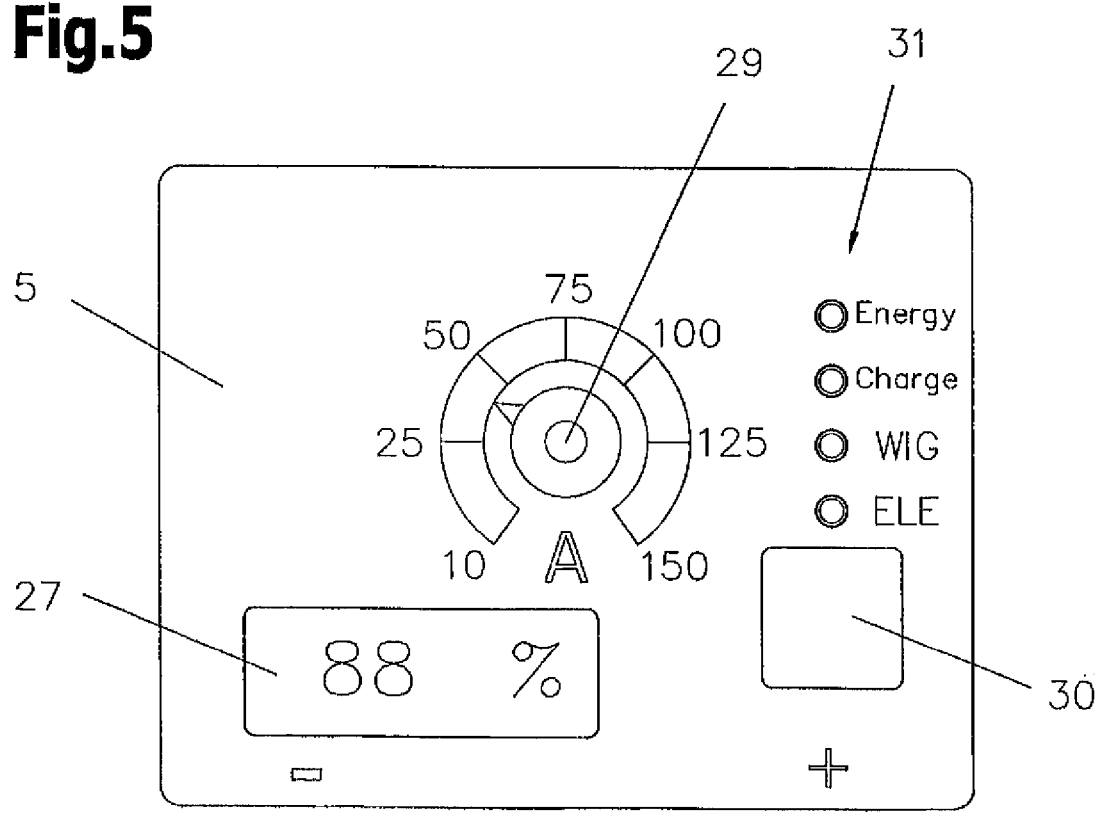

As the power unit 3 according to the invention is employed in particular for the provision of welding energy from an energy storage 2, a limited energy in accordance with the capacity of the energy storage 2 is available to the user. The energy available or parameters derived therefrom can be displayed on a display 27 at an input and/or output device 5 according to FIG. 4 and FIG. 5. For this purpose, preferably, for the generation of the arc 6 a time how long the energy will suffice for the set current will be calculated from the capacity of the energy storage 2 and the current set by means of the setting element 28. The calculation of a parameter, in particular of the time available, i.e. of the remaining time or time left, is for instance carried out in a manner as described in the following.

In energy storages 2 according to prior art, very often so-called "State of Charge" (SOC) controllers and/or "State of Health" (SOH) controllers are integrated. In accordance with the control device 4 of the device 1, said controllers in particular provide the present charging state which corresponds substantially to the capacity of the energy storage 2. Furthermore, also the set current for the arc 6 is known to the control device 4. Said set current is required, as the effectively usable capacity of the energy storage 2 is highly dependent on the loading. In this connection, the loading corresponds to the set current. For instance, when a welding is carried out with a high welding current, the capacity of the energy storage 2 will be exhausted more rapidly than when a welding is carried out with a mean or low welding current. Thus, the capacity of the energy storage 2 as well as the current for operating the arc 6 serve as a basis for the calculation.

When the device 1 is started, for instance the time how long it will be possible to work with the set current will be calculated from the current and the capacity and will be displayed on the display 27. In this connection it is spoken of a remaining time or time left, or in case of a welding device of a remaining welding time. When the current for operating the arc 6, in particular the welding current, is changed, then also the remaining welding time will be corrected correspondingly. As on starting the welding device no welding process has yet been carried out, the displayed remaining welding time only serves as an approximate value. Herein, the actual energy consumption is not yet taken into account. The actual energy consumption is dependent in particular on the length of the arc 6, on the welding electrode 32 used, on the corresponding welding application, etc.

When, now, a welding process is carried out, the control device 4 calculates the actual energy consumption over a certain period of time on the basis of the actual values of the welding current and of the welding voltage or of the current and the voltage of the energy storage 2. On the basis of the energy consumption up to this time, an extrapolation to the future energy consumption can be carried out, and, hence, the remaining welding time, i.e. how much longer the welding can be continued, can be corrected correspondingly and the new value can be displayed on the display 27. This can be carried out at regular time intervals, for instance every five, thirty or sixty seconds, during the operation of the arc 6. On the display 27, the last calculated remaining welding time will be preferably displayed until a new welding process is started, the welding current is changed, or the device 1 is switched off.

Furthermore, at least the last calculated value can be stored so that on the occasion of the next start, said value will be displayed on the display 27.

In order to be able to carry out the calculation of the remaining welding time even more accurately, for instance the actual values collected at regular time intervals will be stored during a welding process. Thus, after the welding process, the energy consumed during the welding process can be calculated on the basis thereof, wherein said value of the energy consumption will be allocated to the set welding current during the welding process. When, now, a welding process is carried out with the same set welding current several times, an average of the energy consumption can be determined. As, correspondingly, also the welding time required for each carried-out welding process will be stored, also said welding time can be averaged. In this manner, a library, so to speak, can be created in which for instance in addition to a plurality of possible settings of the welding current also an average value of the energy consumption over a defined time is stored. In this connection, such a library can be correspondingly updated with each welding process which is carried out. In this manner it is achieved that, when the welding device 1 is started or when the welding current is changed, the energy consumption caused by the set welding current is substantially known from empirically established figures from the library. From the capacity of the energy storage 2 and from the energy consumption per welding process as stored in the library, it can thus be calculated how many welding processes can be carried out with the set welding current and the available capacity of the energy storage 2. As in the library also the welding time belonging to the energy consumption is correspondingly stored, the remaining welding time can be calculated and displayed on the display 27.

Thus, the remaining welding time is iteratively calculated or determined, as the energy which is still available and the present energy consumption are taken into consideration at regular time intervals. Consequently, also the remaining welding time which is displayed on the display 27 is adjusted regularly so that a relatively precise information on the energy storage 2 is available.

The described displaying of the remaining welding time can, of course, also be used for similar functions. This is in particular the case when the energy storage 2 is not combined with a module for welding but for instance with an inverter module or with a tool module.

It is furthermore advantageous when there exists a possibility for the charging of the energy storage 2. When a synchronous step-down converter is used as the power unit 3, also said synchronous step-down converter can be used for charging the energy storage 2 by operating the synchronous converter as a step-up converter. In this connection, the synchronous step-down converter is operated in the reverse direction by exchanging the input and the output. Thus, for the operation of the step-up converter according to FIG. 2, the switch 11, the inductors 12 and the diode 28 are of importance. If the function of the diode 28 is replaced by a switch, it is spoken of a synchronous set-up converter. Accordingly, the switch 11 is used in both modes of operation of the synchronous converter so that for each mode of operation a different control is required. For instance, for the operation as a step-up converter, the control of the switch 11 is activated by activating at the input and/or output device 5 a charging mode (Charge) by means of a setting element 30 according to FIG. 4 and FIG. 5. The activated charging mode is for instance indicated by means of a light emitting diode 31.

Consequently, when the charging mode is activated, the basic precondition is given that the energy storage 2 can be charged. Therefor it is necessary to couple a corresponding voltage source. This is carried out at the output of the synchronous step-down converter which in this case is used as the input of the synchronous step-up converter. In concrete terms, the output is formed by the welding sockets when the power unit 3 is used in a welding device. For example the battery of a vehicle can be used as a voltage source. In the area of the welding sockets there can be provided a reverse battery protection so that the power unit 3 is protected when the voltage source is connected thereto.

According to the generally known function of a step-up converter, the voltage of the voltage source has to be lower than the voltage of the energy storage 2.

After the activation of the charging mode and the connection of the voltage source the energy storage 2 is charged. For that, the switch 11 is controlled such that the voltage of the voltage source is stepped up to the voltage of the energy storage 2. Correspondingly, the charging current for the energy storage 2 flows via the diode 28 to the energy storage 2, wherein the above mentioned possible SOC and/or SOH controllers ensure a uniform charging of individual cells of the energy storage 2. The charging state is monitored by the SOC and/or SOH controllers and is communicated to the control device 4. Thus, the charging state can for instance be indicated in percent on the display 27. Accordingly, the charging process is automatically terminated by the control device 4 as soon as the energy storage 2 is charged completely. This is correspondingly indicated at the input and/or output device 5 of the display 27 or by means of one of the light emitting diodes 31 (Energy). For instance, the light emitting diode 31 (Energy) shines red when the energy store must be charged or green when the energy storage 2 is fully charged. Thus, by means of the setting element 30, for instance a change from the charging mode back again into the welding mode (WIG or ELE) can be carried out.

The welding device can, of course, also have a corresponding connection via which the energy storage 2 can be charged by means of a charging device. In this case, the mode of operation of the synchronous converter as a step-up converter is not required.

Furthermore, it is also possible that at the device 1, in particular a welding device, an additional output in the form of a low-voltage socket is arranged which, preferably, is connected in parallel to the welding outputs or welding sockets at the power unit 3, i.e. that at the welding device 1 there is arranged an output for feeding additional loads. Thus, further loads like lamps, neon tubes, cutting-off grinders, in particular angle grinder modules, glue guns, drilling machines or drilling modules, compass or jig saws or compass or jig saw modules, etc. can be coupled thereto.

In the device 1 or in the welding device there can, of course, also be arranged a step-up converter and a DC/AC module, and thus the additional output can be formed as an AC Voltage output, in particular as a 240V~ socket. In this connection, one or several low-voltage outputs and one AC voltage output can be arranged at the device 1, in particular at the welding device, and, consequently, further devices which are driven with a corresponding voltage can be directly connected to the device 1. When such additional devices are connected thereto and are used, also their energy consumption can be determined and represented in the manner as described above. For this purpose it is possible that a general display for the still available energy and/or a display for the duration of one or several welding processes can be present so that the user can use the available energy in an optimal manner.

The advantage of such a design of the device 1 or of the welding device lies in the fact that now the user has available a welding device for joining materials, to which even additional further devices for further workings, as for instance the separation of materials, can be connected, wherein a common current supply is provided.

The invention claimed is:

1. A method for operating a welding device (1) for the formation of an arc (6) with an energy storage (2), the method comprising the steps of:
providing a power unit (3) with an integrated snubber circuit (10), the power unit (3) comprising a synchronous converter for operating the arc (6) with an output current, the synchronous converter comprising a first switch (9), a second switch (11) and a first inductor (12);
connecting the first switch (9) to the energy storage (2) at an input end;
connecting the first switch (9) to the snubber circuit (10) at an output end;
guiding the output current via the first inductor (12);
switching the first switch (9) of the synchronous converter on and off by a control device (4) in a controlled manner for the conversion of the energy of the energy storage (2) such that the first switch (9) is switched on and off in a snubbed state;
during a switch-on process of the first switch (9), in order to charge the first inductor (12) again, limiting a current rise with a second inductor (13) arranged in series with the first switch (9);
charging the second inductor (13);
increasing a voltage at a connection of the second inductor (13) at an output end up to a voltage of the energy storage (2);

after the switch-on process, activating a control unit (16) formed by a third switch (17);

charging a first capacitor (22) allocated to the first switch (9) at the output end up to the voltage of the energy storage (2) while the first switch (9) is in a switched-on state;

charging a second capacitor (14) arranged at an output end of the third switch (17) via a third inductor (20);

opening the third switch (17) after the complete charging of the first capacitor (22);

charging the second capacitor (14) with the energy stored in the third inductor (20) up to the voltage of the energy storage (2); and at a switch-off process of the first switch (9), with the third switch (17) of the control unit (16) being deactivated, holding the voltage applied at the output end of the first switch (9) substantially at the voltage of the energy storage (2) via the first capacitor (22), so that the first switch (9) is switched off substantially voltage-free, and the energy of the second inductor (13) and of the second capacitor (14) is supplied to the output current.

2. The method according to claim 1, wherein the third switch (17) of the control unit (16) is deactivated in a snubbed state, wherein the third switch (17) is connected to at least a capacitor (18) and a diode (19) at the output end, and wherein the third switch (17) is deactivated only after a charging of the at least one capacitor (18) connected to the third switch (17) at the output end.

3. The method according to claim 1, wherein the synchronous converter is also used for charging the energy storage (2) as a step-up converter wherein an input and an output of the synchronous converter are exchanged.

4. A welding device (1) comprising:
an energy storage (2);
a torch (7) for forming an arc (6);
a power unit (3) for converting the energy of the energy storage (2) for operating the arc (6), the power unit (3) comprising a synchronous converter, the synchronous converter comprising:
  a first switch (9) which can be switched on and off in a controlled manner, the first switch (9) being connected to the energy storage (2) at an input end and to a snubber circuit (10) at an output end, the snubber circuit (10) having storage components for switching on and off of the first switch (9) in a snubbed state;
  a second switch (11) and
  a first inductor (12) for guiding an output current formed by the synchronous converter for operating the arc (6);
an input and/or output device (5) for setting a welding current, the input and/or output, device (5) being connected to a control device (4) and the power unit (3);
a second inductor (13) connected in series with the first switch (9) for an unloading of a switch-on process of the first switch (9) in order to charge the first inductor (12) again;
a control unit (16) formed by a third switch (17);
a diode (23) connected with the first switch (9);
a first capacitor (22) connected to the control unit (16) and allocated to the first switch (9) at the output end; wherein the diode (23) and the first capacitor (22) are for snubbing of a switch-off process of the first switch (9);
a third inductor (20) arranged at an output end of the third switch (17); and
a second capacitor (14) arranged at the output end of the third switch (17);
wherein the third switch (17) is connected with the control device (4) and can be controlled such that the first switch (9) can be switched on and off in the snubbed state;
wherein, after a switch-on process, the third switch (17) of the control unit (16) will be activated, the first capacitor (22) will be charged up to a voltage of the energy storage (2) while the first switch (9) is in a switched-on state, and the second capacitor (14) will be charged via the third inductor (20);
wherein after a complete charging of the first capacitor (22), the third switch (17) will be opened, whereupon the second capacitor (14) is charged up to the voltage of the energy storage (2) with the energy stored in the third inductor (20), at the switch-off process of the first switch (9), with the third switch (17) of the control unit (16) being deactivated; and
wherein the voltage applied at the output end of the first switch (9) is held substantially at the voltage of the energy storage (2) via the first capacitor (22) so that the first switch (9) is switched off substantially voltage-free, and the energy of the second inductor (13) and of the second capacitor (14) is supplied to the output current.

5. The welding device (1) according to claim 4, wherein the snubber circuit (10) is integrated in the synchronous converter.

6. The welding device (1) according to claim 4, wherein a means for charging the energy storage (2) is provided.

7. The welding device (1) according to claim 6, wherein the charging means is formed by the synchronous converter with an input and an output being exchanged so that the synchronous converter can be used as a step-up converter for charging the energy storage (2).

8. The welding device (1) according to claim 6, wherein at the input and/or output device (5) a light emitting diode (31) for indicating the charging state of the energy storage (2) is provided.

9. The welding device (1) according to claim 6, wherein at the input and/or output device (5) a setting element (30) for switching the charging means on or off is provided.

* * * * *